US008868121B2

(12) United States Patent
Ventola et al.

(10) Patent No.: US 8,868,121 B2
(45) Date of Patent: Oct. 21, 2014

(54) CONTROL CHANNEL GAIN FACTOR WITH DATA CHANNEL SCALING

(75) Inventors: Mika Eljas Ventola, Oulu (FI); Antti Olavi Hiltunen, Oulu (FI)

(73) Assignee: Nokia Corporation, Espoo (FI)

( * ) Notice: Subject to any disclaimer, the term of this patent is extended or adjusted under 35 U.S.C. 154(b) by 629 days.

(21) Appl. No.: 12/568,836

(22) Filed: Sep. 29, 2009

(65) Prior Publication Data

US 2010/0087202 A1    Apr. 8, 2010

Related U.S. Application Data

(60) Provisional application No. 61/194,712, filed on Sep. 29, 2008.

(51) Int. Cl.
*H04W 52/14* (2009.01)
*H04W 52/36* (2009.01)
*H04W 52/52* (2009.01)

(52) U.S. Cl.
CPC .......... *H04W 52/146* (2013.01); *H04W 52/367* (2013.01); *H04W 52/52* (2013.01)
USPC ........................................... 455/522; 370/318

(58) Field of Classification Search
CPC ..... H04W 52/04; H04W 52/18; H04W 52/30; H04W 52/00
See application file for complete search history.

(56) References Cited

U.S. PATENT DOCUMENTS

| 2007/0121554 A1* | 5/2007 | Luo et al. ................. 370/335 |
| 2008/0159184 A1* | 7/2008 | Niwano .................... 370/278 |
| 2008/0214196 A1* | 9/2008 | Sambhwani et al. ....... 455/446 |
| 2009/0059892 A1* | 3/2009 | Marinier et al. ........... 370/349 |

* cited by examiner

*Primary Examiner* — Marcos Batista
(74) *Attorney, Agent, or Firm* — Banner & Witcoff, Ltd.

(57) ABSTRACT

There is provided a method and a program and an apparatus (e.g., a user equipment) that determines a data channel gain factor and a control channel gain factor; determines that total transmit power would exceed a maximum allowed value after applying the data and control channel gain factors; reduces the data channel gain factor so that the total transmit power does not exceed the maximum allowed value; and uses the control channel gain factor that is applied before the data channel factor is reduced when a boost mode is configured for the control channel (e.g., if $TFCI_i > E\text{-}TFCI_{ec,\ boost}$). There may a plurality k of data channels $E\text{-}DPDCH_k$ and k data channel gain factors $\beta_{ed,\ k}$ which are reduced by scaling each of them equally. When the boost mode is not configured the control channel gain factor which is used is received in signaling from an access node.

20 Claims, 2 Drawing Sheets

CONTROL CHANNEL GAIN FACTOR WITH DATA CHANNEL SCALING

CROSS REFERENCE TO RELATED APPLICATION

This patent application claims priority under 35 USC 119 (e) to U.S. Provisional Patent Application 61/194,712, filed Sep. 29, 2009, the contents of which is incorporated by reference herein in its entirety.

TECHNICAL FIELD

The teachings herein relate generally to wireless networks that use control and data channels with related amplitude/gain, and are particularly advantageous for the HSUPA system and gain factor used on the uplink for the control channel.

BACKGROUND

The following abbreviations and terms are herewith defined:
3GPP third generation partnership project
DL downlink
Node B base transceiver station or other access node
E-DCH enhanced dedicated channel
E-DPCCH E-DCH dedicated physical control channel
E-DPDCH E-DCH dedicated physical data channel
E-TFC E-DCH transport format combination
E-TFCS E-DCH transport format combination set
E-UTRAN evolved UTRAN
FDD: frequency division duplex
HSUPA high speed uplink packet access
LTE long term evolution of 3GPP
Node B base station or similar network access node
TDD time division duplex
UE user equipment (e.g., mobile equipment/station)
UL uplink
UMTS universal mobile telecommunications system
UTRAN UMTS terrestrial radio access network
WCDMA wideband code division multiple access One of the 3GPP wireless access technologies is WCDMA/HSUPA. As currently specified in 3GPP release 6 (and release 7) the uplink gain factors for E-DPDCH are calculated according to the E-DCH Transport Format Combination (E-TFC). The gain factor for E-DPCCH, and a set of reference gain factors (up to eight) for the E-DPDCH, namely the values, are signaled by the UTRAN. Up to 127 E-TFCs may exist and be used and, thus, for those E-TFCs which are not in the set of reference gain factors gain factors must be computed by the UE and BTS using an equation defined in 3GPP TS 25.214 (Technical Specification Group Radio Access Network; Physical layer procedures (FDD), which is attached to the priority document as Appendix A (sections 5.1.2.5A through 5.1.2.6)). Thus, for each E-DPDCH data rate there exists a specific network configured power offset between the E-DPCCH/DPCCH and the E-DPDCH/DPCCH.

The gain factor is directly related to the amplitude of the channel that is transmitted from the UE towards the NodeB. The power of the DPCCH is controlled by the NodeB by the power control commands (UP, DOWN), and the power of other channels that are going to be transmitted are set according to rules defined in 3GPP TS 25.214, section 5 and are constrained by the total transmit power available in the UE.

Specifics concerning the gain factors and how they are computed are currently specified at 3GPP TS 25.214, section 5.1.2.5B (setting the UL E-DPCCH and E-DPDCH powers relative to E-DPCCH power).

In the Release 6 specification of 3GPP the gain factor of the E-DPCCH is signaled from the NodeB to the UE. Next the UE shall execute an E-TFC selection process in order to determine the E-TFC and the E-DPDCH gain factor(s) are calculated according to the determined E-TFC. The E-DPCCH gain factor does not depend on the E-DPDCH gain factor(s) in this case.

In order to support higher data rates the range of E-DPDCH gain factor(s) is greater in the Release 7 than in the Release 6. However, this also requires that the range of E-DPCCH gain factor is also greater in the Release 7 than in the Release 6. Therefore, two operational modes are available in the Release 7 specification: E-DPCCH normal mode and boost mode. The purpose of the boost mode is to provide more power for E-DPCCH in order to offer an enhanced reference signal for the BTS. The requirement to use boost mode is signaled to the UE by means of an E-TFCI boost parameter, designated as $E\text{-}TFCI_{ec,boost}$.

When the E-DPCCH boost mode is not configured the E-DPCCH gain factor is the signaled one as in the Release 6. When the E-DPCCH boost mode is configured the E-DPCCH gain factor depends on the E-DPDCH gain factor(s) and on the traffic to total pilot offset parameter that is designated as $\Delta T2TP$ and signaled to the UE. The determination of E-DPCCH and E-DPDCH gain factors is defined at 3GPP TS 25.214, section 5.1.2.5A through C, reproduced at Appendix A of the priority document. Also in this case the E-DPCCH gain factor is signaled to the UE, but the signaled E-DPCCH gain factor is the minimum gain factor the E-DPCCH is allowed to obtain. After the channel gain factors are set, the total transmit power the UE is going to use is at maximum the maximum allowed transmit power for the UE. However, if the total transmit is close enough, or equal to the maximum allowed transmit power and a "power up" command (UP) were received and applied at the UE the total transmit power would exceed the maximum allowed transmit power. In order to UE not to exceed the maximum allowed transmit power yet obeying the "power up" command the specification defines a scaling process (E-DPDCH scaling) the UE is required to apply when the maximum transmit power would be exceeded.

According to 25.214, section 5.1.2.6 the "UE must first reduce E-DPDCH transmit power to minimum, and, if this is not enough, to proceed further with equal scaling of all channels in order to guarantee that the maximum allowed transmit power is not exceeded". In practice this means that before a next transmission event is going to take place the UE must calculate the total transmit power (P_tx) that would be used in the next transmission event. The calculated total transmit power (P_tx) is compared with the maximum allowed transmit power (P_max) and if the calculated total transmit power (P_tx) would exceed the maximum allowed transmit power (P_max) the scaling of E-DPDCH channel(s) is applied. It is also important to notice that in its current form the Release 7 specification does not disclose anything about the E-DPCCH.

SUMMARY

The foregoing and other problems are overcome, and other advantages are realized by the use of the exemplary embodiments of this invention.

In a first aspect thereof the exemplary embodiments of this invention provide a method comprising: determining a data channel gain factor and a control channel gain factor, determining that total transmit power would exceed a maximum allowed value after applying the data and control channel gain factors: reducing the data channel gain factor so that the total transmit power does not exceed the maximum allowed value, and using the control channel gain factor that is applied before the data channel gain factor is reduced when a boost mode is configured for the control channel.

In a second aspect thereof the exemplary embodiments of this invention provide an apparatus that comprises at least one processor and at least one transmitter. In this aspect the at least one processor is configured to determine a data channel gain factor and a control channel gain factor, to determine that total transmit power would exceed a maximum allowed value after applying the data and control channel gain factors, and to reduce the data channel gain factor so that the total transmit power does not exceed the maximum allowed value. The at least one transmitter is configured to transmit the control channel using the control channel gain factor that is applied before the data channel gain factor is reduced when a boost mode is configured for the control channel.

In a third aspect the exemplary embodiments of this invention provide a memory storing a program of computer readable instructions that when executed by a processor result in actions comprising: determining a data channel gain factor and a control channel gain factor; determining that total transmit power would exceed a maximum allowed value after applying the data and control channel gain factors; reducing the data channel gain factor so that the total transmit power does not exceed the maximum allowed value; and using the control channel gain factor that is applied before the data channel gain factor is reduced when a boost mode is configured for the control channel.

These and other aspects of the invention are detailed below with particularity.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

Figure 1:
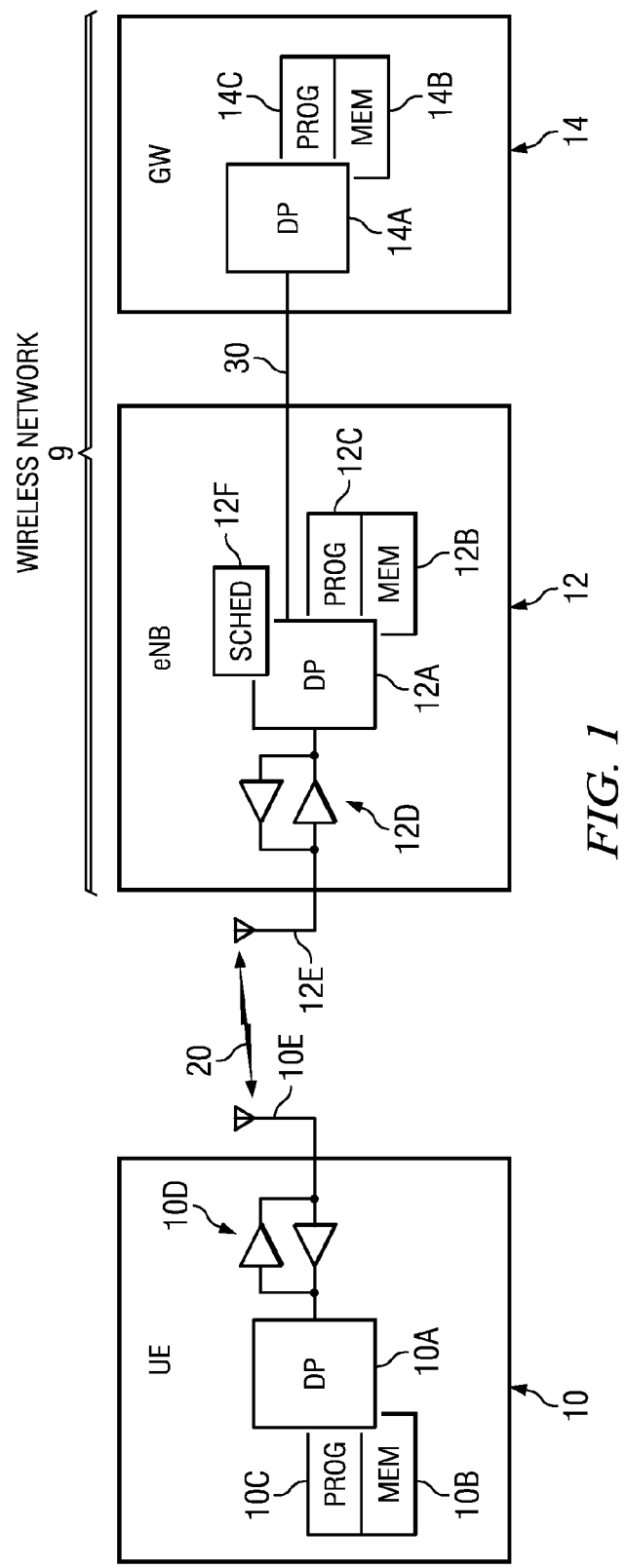
FIG. 1 shows a simplified block diagram of various electronic devices that are suitable for use in practicing the exemplary embodiments of this invention.

It is initially noted that the examples and explanations below are in the context of a UTRAN network (also known as WCDMA or 3G), but embodiments of this invention are not so limited and may be employed in any network protocol, such as for example E-UTRAN (enhanced universal mobile telecommunications system terrestrial radio access network), GSM (global system for mobile communications), WLAN (wireless local area network), WiMAX (worldwide interoperability for microwave access) and the like, in which downlink transmissions are multiplexed to different users. Further, the various names used in the description below (e.g., E-DPCCH, E-DPDCH, TFCI, boost indicator $E\text{-}TFCI_{ec,boost}$, etc.) are not intended to be limiting in any respect but rather serve as particularized examples directed to specific UTRAN/E-UTRAN implementations using current UTRAN/E-UTRAN terms for a clearer understanding of the invention. These terms/names may be later changed in UTRAN and/or E-UTRAN and they may be referred to by other terms/names in different network protocols, and these teachings are readily adapted and extended to such other protocols.

The E-DPDCH scaling is a known and mandatory feature from the Release 6 specifications. However, the Release 7 introduces a new problem due to the E-DPCCH boost mode.

E-DPDCH scaling is not a problem in the Release 6 specification or in the Release 7 specification when the E-DPCCH boost mode is not configured, because in both cases the E-DPCCH gain factor is signaled to the UE and therefore the E-DPCCH power that must be applied is explicitly defined. Under the existing Release 6 specification and under the existing Release 7 specification when the E-DPCCH boost mode is not configured, the E-DPCCH power is signaled to the UE by means of the E-DPCCH gain factor and the signaled value is valid for the network although the scaling of E-DPDCH power has been applied. As described above, under the existing Release 7 specification when the E-DPCCH boost mode is configured, the E-DPCCH gain factor depends on the E-DPDCH gain factor(s) and on the traffic to total pilot offset parameter. However, currently there is a problem in the Release 7 specification when the boost mode is configured and E-DPDCH scaling is applied because the determination of E-DPCCH power in this case is not specified and neither the network nor the UE knows how the value of the E-DPCCH power should be determined. Also in this case the minimum value the UE may apply to the E-DPCCH gain factor is not known. The determination of E-DPCCH power in this case is important to enable optimal performance of the system yet maintaining the simple implementation. Furthermore, if the determination of E-DPCCH power is not defined in the Release 7 specification it is possible that the different UE implementations may be developed, which complicates the network implementation and configuration.

This application discloses novel means to solve the aforementioned problem. Four aspects of invention are disclosed, each of them emphasizing either simplicity of system implementation, system performance or a compromise between them.

Prior to detailing the various exemplary embodiments of the invention, reference is now made to FIG. 1 for illustrating a simplified block diagram of various electronic devices that are suitable for use in practicing the exemplary embodiments of this invention which are detailed with particularity below.

In FIG. 1 a wireless network 9 is adapted for communication between a UE 10 and a Node B 12. The network 9 may include a gateway GW/serving mobility entity MME/radio network controller RNC 14 or other radio controller function known by various terms in different wireless communication systems. The UE 10 includes a digital processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 20 with the Node B 12

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 12 also includes a DP 12A, a MEM 12B, that stores a PROG 12C, and a suitable RF transceiver 12D coupled to one or more antennas 12E. The Node B 12 may be coupled via a data path 30 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the Node B 12 over the Iub link 30.

Also within the Node B 12 is a scheduler 12F that schedules the various UEs under its control for the various UL and DL radio resources/subframes. Once scheduled, the Node B sends messages to the UEs with the scheduling grants (typically multiplexing grants for multiple UEs in one message). These grants are sent over the particular channels noted with the specific embodiments detailed above. Generally, the Node B/eNode B 12 of a UTRAN/E-UTRAN system is fairly autonomous in its scheduling and need not coordinate with the GW/MME 14 excepting during handover of one of its UEs to another Node B/eNode B.

At least one of the PROGs 10C, 12C and 14C is assumed to include a program of computer readable instructions that, when executed by the associated DP, enable the electronic device to operate in accordance with the exemplary embodiments of this invention, as detailed below. Inherent in the DPs 10A, 12A, and 14A is a clock to enable synchronism among the various apparatus for transmissions and receptions within the appropriate time intervals and slots required, as the scheduling grants and the granted resources/subframes are time dependent.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the Node B 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The invention may be implemented as a computer program stored on any one or combination of such computer readable memories within a single apparatus 10, 12. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples. Embodiments of the invention may be stored in the local MEM and implemented/executed by a common processor such as the DP 10A shown at FIG. 1 or within a modem disposed in the transceiver 10D (e.g., within a transceiver front end chip as a digital signal processor DSP) that supports Release 7. Note that while FIG. 1 illustrates a single processor for the UE 10 and the Node B 12, either may include multiple processors, typically one main processor in a master relation to others such as power control, radiofrequency and baseband processors that are in a slave relation to the master. These teachings may be implemented in any such singular processor such as the baseband or power control processor or in various combinations of those multiple processors Now are described separately four solutions to solve the above noted problems with boost mode in Release 7 and to specify how the UE is to scale the gain factor for the control channel (e.g. E-DPCCH) when the boost mode is operative for the data channel (e.g., E-DPDCH). While these aspects of the invention are described separately for clarity purposes, it is understood that they may be combined as noted herein or also in other combinations that may not be explicitly detailed.

In a first aspect of the invention, it is selectable whether the UE does or does not scale the E-DPCCH gain factor with the E-DPDCH gain factor. In this aspect of the invention the preferred behavior is signaled explicitly from the Node B 12 to the UE 10. In an exemplary embodiment of this first aspect this signaling is done with a single additional bit that can be delivered in the Radio Bearer Setup (RBS) and/or the Radio Bearer Reconfiguration (RBR) message together with the existing E-TFCI$_{ec,boost}$ (the boost parameter). In one variation this additional bit will indicate whether the UE should reduce or maintain the current E-DPCCH gain factor if the E-DPDCH gain factors are to be scaled when the boost mode is configured. In another variation, this additional bit need not always be sent in the RBS/RBR message; it can be defined as an optional bit (e.g., in the radio link control specifications) in which case there would be one default behavior for the UE and the additional bit is signaled only if one of the optional behaviors are to be used. This would save on signaling overhead since the bit would not be included in each and every RBS/RBR message. The default UE behaviour could be, for example, to maintain the E-DPCCH gain factor although E-DPDCH gain factors are scaled. For the second variation noted above the single bit is still capable of indicating two different states, and so the optional behaviors signaled by the additional bit could be, in an exemplary embodiment, to calculate the E-DPCCH gain factor that corresponds to the E-DPDCH gain factor(s) or to apply equal scaling (as detailed further below in the fourth aspect of the invention).

Implementation of this first aspect of the invention is preferably by being specified the controlling wireless standard, and so the meaning of the additional bit in any of the variations above is stored in the local memory of the UE 10 and the Node B 12 and the actions related to it are taken by the processor with reference to the local memory. One particular advantage of this first aspect is that it enables the Node B to define explicitly how the E-DPCCH power must behave in any particular instance when the boost mode is configured. While the additional bit represents an increase in signaling information (which would preferably be standardized), making it signaled only when the default behavior is to be overridden is seen to minimize the increase to signaling overhead that this first aspect of the invention imposes. One technical effect of the first aspect of invention is that it improves system performance by enabling configurability.

In a second aspect of the invention, the E-DPCCH gain factor and boost mode are taken into account in the E-DPDCH scaling. Specifically, all E-DCH gain factors (i.e. E-DP- DCH gain factor(s) and E-DPCCH) are scaled so that the total calculated transmit power (P_tx) is scaled down so that it equals to the maximum allowed transmit power (P_max) the UE is not allowed to exceed. Note that this may be used independent of the additional bit described above in the first aspect of the invention, or it may be implemented as the specific manner in which gain factors are scaled when the additional bit of the first aspect in fact indicates to scale (or for when the default mode for the UE is to scale and the additional bit is not sent when the boost mode is configured and scaling is desired).

An algorithm stored in the local MEMs of the UE 10 and the Node B 12 can be used to resolve the E-DPDCH scaling. In an exemplary embodiment, such a proposed algorithm has as its inputs the total calculated transmit power (P_tx); the maximum allowed transmit power (P_max); and channel gain factors. The outputs of the exemplary algorithm are then the scaled E-DPDCH gain factor(s); and the corresponding (scaled) E-DPCCH gain factor. It is noted that the total calculated power above is not the power that will be used to transmit but rather the power that would be used if E-DPDCH scaling were not applied. It is used here to assure that when E-DPDCH scaling is applied, the maximum transmit power is not exceeded in the actual transmission.

In an exemplary embodiment such an algorithm operates according to the following steps (the order of these steps is exemplary; any of the three main steps may be done in a different order or concurrently; all that is required is that the step 'determine the E-DPDCH gain factor(s) . . . ' follow the 3 main steps that are listed previous to it below:

Determine the E-DPCCH gain factor;

Determine the gain factors of other active channels;

Determine the total calculated transmit power (P_tx) and the maximum allowed transmit power/value (P_max);

If the boost mode is configured and the total total calculated transmit power (P_tx) is greater than the maximum allowed transmit power/value (P_max), then determine the E-DPDCH gain factor(s) and the corresponding E-DPCCH gain factor based on the total calculated transmit power (P_tx), maximum allowed transmit power (P_max), the gain factors of other active channels.

Optionally, before settling on the final E-DPDCH gain factor(s), verify that the determined E-DPCCH gain factor is at minimum the signaled E-DPCCH gain factor;

If the boost mode is configured and the E-DPCCH gain factor determined and verified above is less than the signaled E-DPCCH gain factor, then determine the E-DPDCH gain factor(s) based on the total calculated transmit power (P_tx), maximum allowed transmit power/value (P_max), the gain factors of other active channels and the signaled E-DPCCH gain factor.

If the boost mode is not configured and the total total calculated transmit power (P_tx) is greater than the maximum allowed transmit power/value (P_max);

Determine the E-DPDCH gain factor(s) based on the total transmit power (P_tx), the maximum allowed transmit power/value (P_max), the gain factors of other active channels and the signaled E-DPCCH gain factor.

One detailed example how to determine the E-DPDCH and E-DPCCH gain factors according to one particular embodiment that is consistent with this second aspect of invention can be found in Appendix A of the priority document, which reproduces sections 5.1.2.5A through 5.1.2.6 of 3GPP TS 25.214 and shows how the E-DPDCH and the E-DPCCH are scaled according to the dependency in 3GPP Release 7.

It is noted that the validity check of the above algorithm (that the determined E-DPCCH gain factor(s) is at minimum the signaled E-DPCCH gain factor) may not be fully backward compatible with Release 6 for the case that the E-DPCCH power (gain factor) remains on the boosted level. The validity check of this second aspect of the invention for scaled E-DPCCH is an optional feature to enhance that backward compatibility, and assures that the E-DPCCH that has been boosted and then scaled down is not scaled below the signaled E-DPCCH. So an alternative exemplary algorithm according to this variation of the second aspect of the invention may implement a direct calculation (or iterations based on trial and error) that the power as scaled remains within the maximum transmit power by performing the following steps:

depending on the configuration of the boost mode, the E-DPCCH gain factor must be calculated based on the E-DPDCH gain factor(s) or the signaled E-DPCCH is to be used as such, as well as the total calculated transmit power (P_tx), the maximum allowed transmit power/value (P_max) and the gain factors of the other active channels; and optionally, if calculated the validity of the determined E-DPCCH gain factor must be verified to guarantee that the E-DPCCH gain factor is at a minimum the signaled E-DPCCH gain factor (e.g., not scaled below the signaled E-DPCCH gain factor); and if the E-DPCCH gain factor determined above was scaled below the signaled E-DPCCH gain factor, the scaling is re-done by using the E-DPDCH gain factor(s) and the signaled E-DPCCH gain factor (as well as the total calculated transmit power (P_tx), the maximum allowed transmit power/value (P_max) and the gain factors of the other active channels).

These are important considerations for this second aspect of the invention. It is important to notice that one technical effect is that embodiments of this second aspect of the invention can be formulated in a rather compact form, despite the complexity of the scaling factor being applied.

This second aspect of the invention may be stored in the local MEM and implemented/executed by a processor such as the DP 10A shown at FIG. 1 executing a program of computer readable instructions stored on that local MEM, or such a processor may be within a modem disposed in the transceiver 10D (e.g., within a transceiver front end chip as a digital signal processor DSP or power control processor slaved to the main processor) that supports Release 7. Embodiments of this second aspect of the invention solve the scaled E-DPDCH and E-DPCCH gain factors according to the current total power and available power.

One technical effect of the second aspect of invention is that while scaling both channels, the un-necessary overhead of E-DPCCH can be reduced to better correspond to the reduced E-DPDCH power that improves the system performance.

According to a third aspect of the invention, when there is scaling of the E-DPDCH and the boost mode is configured, only the E-DPDCH power is reduced while the current E-DPCCH power is maintained. This can be obtained, for example, by first calculating the E-DPDCH gain factor(s) and the corresponding E-DPCCH gain factor as defined in 3GPP TS 25.214; i.e. after calculating the corresponding E-DPCCH gain factor the UE determines which one of the E-DPCCH gain factors is the greater one—the signaled one or the one that corresponds to the E-DPDCH gain factor(s) that was first calculated. The UE then applies the selected gain factor to the E-DPCCH. Then, prior to transmitting E-DPCCH at the selected/greater gain factor, the UE receives and applies the power control command and computes the total transmit power, and if the total power exceeds the maximum transmit power then the UE will perform the scaling. Now according to this third aspect of the invention, if the total transmit power is exceeded the scaling of the E-DPDCH gain factor(s) is done while maintaining (i.e. not-scaling) the applied E-DPCCH gain factor.

To most readily implement this third aspect of the invention, the specification may be amended as compared to its current version so as to read (for example): "When E-DCH is configured, if the total UE transmit power (after applying DPCCH power adjustments and gain factors) would exceed the maximum allowed value, the UE shall firstly reduce all the E-DPDCH gain factors by an equal scaling factor to respective values so that the total transmit power would be equal to the maximum allowed power AND USE THE SIGNALED E-DPCCH GAIN FACTOR WHEN THE E-DPCCH BOOST MODE IS NOT CONFIGURED OR USE THE E-DPCCH GAIN FACTOR APPLIED BEFORE THE REDUCTION OF E-DPDCH GAIN FACTORS WHEN THE E-DPCCH BOOST MODE IS CONFIGURED." As with all embodiments that might be reflected in a standard that specifies the UE 10 and Node B 12 actions and the meanings of various signaling bits, the required behavior can be implemented by means of executing a computer program stored in the local memory of the UE 10 and Node B 12 so as to comply with the specification change noted immediately above for this third aspect of the invention.

One particular technical effect of this third aspect of the invention is that it guarantees that the behavior of the E-DPCCH power is similar (i.e. maintained on the level before the scaling) between the previous, current and future versions of that specification and that proposed above, whether or not the boost mode is configured. This is beneficial from the network point of view as it guarantees that the control channel power remains on the level prior the scaling and does not change despite the E-DPDCH power being reduced.

Another technical effect of this third aspect of the invention is that it simplifies the implementation within the UE as compared to the other distinct solutions detailed herein, particularly because the existing scaling algorithms of Release 6 can be used even when the Release 7 boost mode is configured without the need to determine the corresponding E-DPCCH gain factor while the E-DPDCH is scaled.

A fourth aspect of the invention is described by example as follows. When the E-DPDCH scaling is done and the boost mode is configured, both power of E-DPDCH(s) and the E-DPCCH power are reduced similarly; i.e., equal scaling is applied for both channels. This 'equal scaling' is in an embodiment first applying the scaling to the E-DPDCH(s) and the E-DPCCH. In this embodiment the sum of the E-DPDCH(s) and E-DPCCH powers is reduced while maintaining their relative power. Furthermore, in this embodiment the minimum power the E-DPCCH may obtain is the power of the signaled E-DPCCH gain factor i.e. it is preferable but not mandatory to verify that the scaled E-DPCCH power is at minimum the signaled E-DPCCH power. If the equal scaling of the E-DPDCH and E-DPCCH is not enough to fill the UE's maximum transmit power, then applying equal scaling to all channels including the E-DPDCH and E-DPCCH. This fourth aspect of the invention may be readily used alone or in combination with the first and/or second aspects of the invention detailed above.

As with above three aspects, the specification may be advantageously modified somewhat to define the system behavior in this case. For example, the current specification states: "When E-DCH is configured, if the total UE transmit power (after applying DPCCH power adjustments and gain factors) would exceed the maximum allowed value, the UE shall firstly reduce all the E-DPDCH gain factors by an equal scaling factor to respective values so that the total transmit power would be equal to the maximum allowed power." In a exemplary embodiment to more readily implement this fourth aspect of the invention, the specification may instead state: "When E-DCH is configured, if the total UE transmit power (after applying DPCCH power adjustments and gain factors) would exceed the maximum allowed value, the UE shall firstly reduce all the E-DPDCH gain factors AND E-DPCCH GAIN FACTOR by an equal scaling factor to respective values so that the total transmit power would be equal to the maximum allowed power." It may also state: "Verify that the scaled E-DPCCH power is at a minimum the signaled E-DPCCH power" as a preferable but not mandatory feature.

Embodiments of this fourth aspect of the invention may be implemented in the UE 10 by a computer program stored in the local memory that when executed operates so as A) to determine the UE total calculated transmit power after determining the channel gain factors; B) to compare that determined power to a maximum allowed transmit power; and C1) for the case where the determined power is less than or equal to the maximum allowed transmit power to transmit on the E-DPDCH and the E-DPCCH at a power adjusted by the gain factor and C2) for the case where the determined power is greater than the maximum transmit power to reduce the E-DPDCH gain factor and the E-DPCCH gain factor by an equal scaling factor such that after reducing the total transmit power does not exceed the maximum transmit power and then transmit on the E-DPDCH and the E-PDCCH at the reduced powers. A similar program (absent the transmitting elements) may be also stored in the memory of the Node B 12 so that it might anticipate the resultant transmit power that the UE sends the E-DPDCH and the E-PDCCH, given a particular E-DPDCH gain factor the Node B sends or would like to send to the UE when the boost mode is configured.

One particular technical effect of an embodiment of this fourth aspect of the invention is that it clarifies the behavior of E-DPCCH power (i.e. gain factor) when the E-DPDCH scaling occurs when the boost mode is configured. Another technical effect is that the scaling method of this fourth aspect of invention can be implemented in the UE with rather limited modifications to the existing scaling algorithms of Release 6 yet still providing means to scale both the E-DPCCH and the E-DPDCH gain factors when the boost mode is configured and E-DPDCH scaling occurs. Another technical effect is that while scaling both channels equally the un-necessary overhead of E-DPCCH can be reduced to better correspond to the reduced E-DPDCH power. This improves the system performance.

Figure 2:
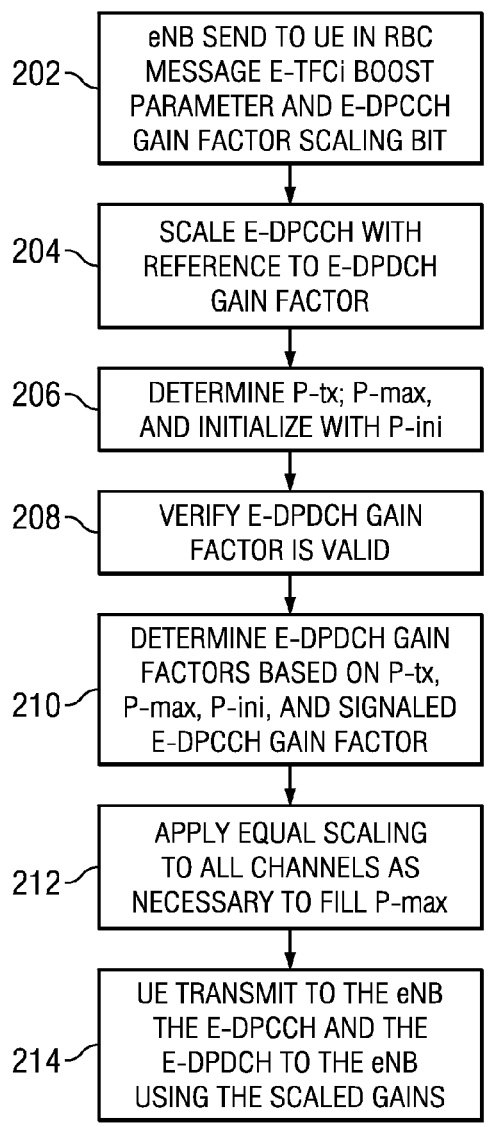
FIG. 2 shows a process flow diagram according to an exemplary embodiment of the invention.

Certain of the above aspects are shown at FIG. 2. At block 202 the Node B 12 sends to the UE 10 an RBS/RBR message that has both the E-TFC$_{ec,boost}$ parameter and the E-DPCCH gain factor scaling bit according to the first aspect of the invention detailed above. The Node B 12 also signals to the UE the E-DPCCH gain factor. Based on that E-DPCCH gain factor scaling bit (or its absence if in fact the default mode where the bit is not signaled is to scale E-DPDCD) then at block 204 the UE scales the E-DPDCH with reference to the signaled E-DPCCH gain factor. This is done in an exemplary embodiment as follows. At block 206 the UE determines P_tx, P_max, and initializes with the E-DPCCH gain factor and the gain factors of the other active channels. At block 208 the UE verifies that the E-DPDCH gain factor is valid, such as by the E-DPDCH gain factor scaling bit or the default mode of the specification. At block 210 the UE 10 determines E-DPDCH gain factors based on the P-tx, P-max, with the gain factors of the other active channels, and the signaled E-DPCCH gain factor. Then at block 212 the UE applies equal scaling to all channels as necessary to fill P_max, according to the fourth aspect of the invention above. Finally at block 214 the UE transmits to the Node B the E-DPCCH and the E-DPDCH to the Node B using the scaled gains.

The Node B 12 may compute the scaling factor equivalently to the UE 10 so that it signals to the UE 10 the proper gain factor, or so that the Node B 12 correctly anticipates the power of the E-DPCCH sent by the UE 10 that the Node B 12 will receive. For the aspects of this invention related to the Node B 12, embodiments of this invention may be implemented by computer software executable by a data processor of the Node B 12, such as the processor 12A shown, or by hardware, or by a combination of software and hardware. For the aspects of this invention related to UE 10, embodiments of this invention may be implemented by computer software executable by a data processor of the UE 10, such as the processor 10A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

Figure 3:
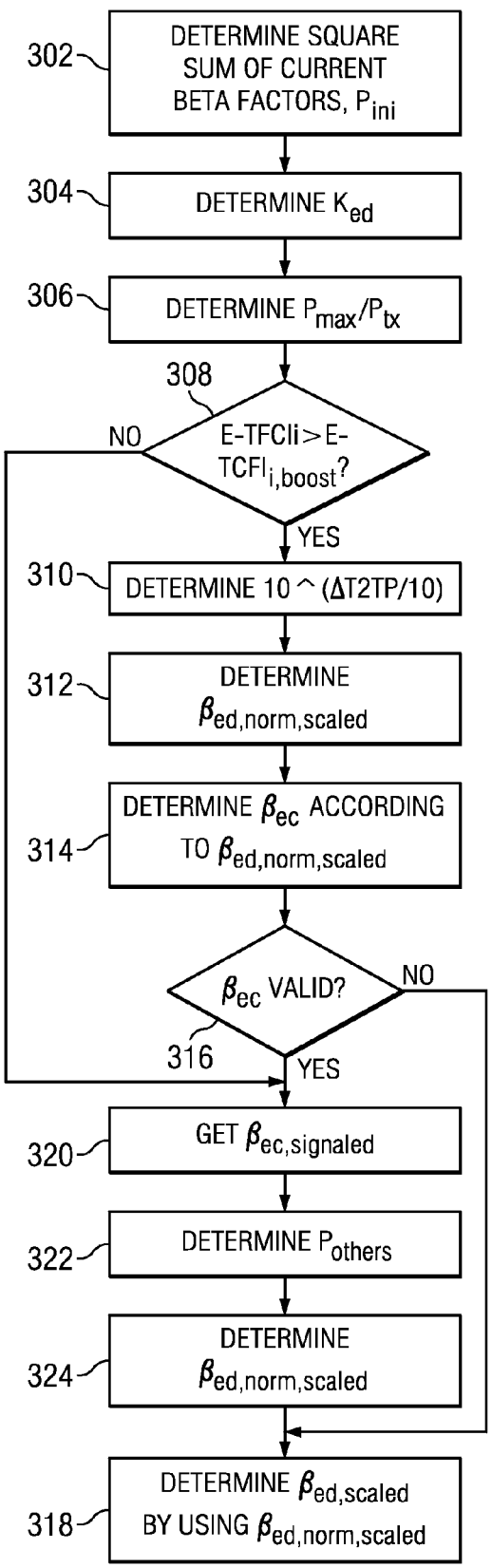
FIG. 3 shows another process flow diagram for E-DPDCH scaling for normal and boost mode according to another exemplary embodiment of the invention.

FIG. 3 illustrates another flow diagram in which the second aspect of the invention is adapted so that in one case the E-DPCCH is scaled according to the E-DPDCH gain factor (s) while the E-DPCCH boost mode is configured, and in another case there is equal scaling of the E-DPDCH and the E-DPCCH while in the E-DPCCH boost mode. FIG. 3 may optionally begin with the additional bit signaled from the Node B 12 as noted above with respect to the first aspect of the invention. Then the UE (and optionally also Node B) would have two algorithms stored, one to compute and output E-DPCCH power as scaled with the E-DPDCH gain factor(s), and another to compute and output E-DPCCH power as well as E-DPDCH power using equal scaling power reductions. For the case wherein the first aspect additional signaling bit is incorporated, then one indication of the bit may be interpreted to enable the third aspect of the invention detailed above in which the E-DPCCH is maintained (not scaled) while the E-DPDCH power is reduced by the gain factor signaled from the Node B 12.

FIG. 3 illustrates process steps for the embodiment in which the E-DPCCH power is scaled with the E-DPDCH gain factor(s) for normal and boost mode. The determination of E-DPDCH and E-DPCCH gain factors when E-DPDCH scaling is applied must take into account the configuration of the E-DPCCH boost mode and the minimum allowed E-DPCCH gain factor, which the Node B 12 signals to the UE 10.

Algorithm Description for the Normal Mode.

The E-DPDCH scaling must be applied when the total transmit power, $P_{tx}$, exceeds the maximum allowed transmit power, $P_{max}$. The definition of total transmit power before the scaling can be written as $$P_{tx} = P \cdot \sigma_{ini} = P(\beta_c^2 + \beta_d^2 + \beta_{hs}^2 + \beta_{ec}^2 + \beta_{ed,1}^2 + \beta_{ed,2}^2 + \beta_{ed,3}^2 + \beta_{ed,4}^2), \quad (1)$$

where $\sigma_{ini}$ is the square sum of the channel gain factors and P is a power value; $\beta_c$ and $\beta_d$ are signaled for the transport format combination (TFC) or computed for the TFC based on the signaled settings for a reference TFC; $\beta_{hs}$ is the gain factor of HS-DPCCH; $\beta_{ec}$ is the E-DPCCH gain factor; $\beta_{ed}$ represent the E-DPDCH gain factors for the various E-DPDCHs [four in the example assumed by equation (1), indexed by k at equations (4) and (5) below]. These beta parameters are detailed at 3GPP TS 25.214, sec. 5. The transmit power $P_{tx}$, scaled after the scaling, on the other hand, can be written as a sum of square sums of the dedicated, HS-DPCCH and scaled enhanced channels i.e. by $$P_{tx,scaled} = P(\sigma_{others} + \sigma_{enh}) \quad (2)$$

where $$\sigma_{others} = \beta_c^2 + \beta_d^2 + \beta_{hs}^2 \quad (3)$$

is the square sum (i.e. sample power) of the gain factors of the dedicated channels and HS-DPCCH channel and $$\sigma_{enh} = \beta_{ec,scaled}^2 + \sum_{k=1}^{4} \beta_{ed,k,scaled}^2 \quad (4)$$

is the square sum of the scaled enhanced data channels. The square sum of the beta factors are determined at block 302 of FIG. 3 by any of the above approaches.

It is also possible to convert the square sum of E-DPDCH channels to a simpler form by having a scalar multiplier and a normalized E-DPDCH gain factor by $$\sum_{k=1}^{4} \beta_{ed,k,scaled}^2 = K_{ed} \beta_{ed,norm,scaled}^2 \quad (5)$$

where $\beta_{ed,norm,scaled}$ is a normalized E-DPDCH gain factor, $K_{ed}$ belongs to the set $K_{ed} \in \{1,2,6\}$ and the value of $K_{ed}$ depends on the channel configuration. This is determined at block 304 of FIG. 3. The set of $K_{ed}$ can be easily determined by noticing that $\beta_{ed,1} = \beta_{ed,2}$, $\beta_{ed,3} = \beta_{ed,4}$, $\beta_{ed,3} = \sqrt{2} \beta_{ed,1}$ and therefore $$K_{ed} \beta_{ed,norm}^2 = \sum \beta_{ed,k,scaled}^2 \quad (6)$$

$$= \begin{cases} \sum_{k=1}^{1} \beta_{ed,k,scaled}^2 = \beta_{ed,1,scaled}^2 \\ \sum_{k=1}^{2} \beta_{ed,k,scaled}^2 = 2\beta_{ed,1,scaled}^2 \\ \sum_{k=1}^{4} \beta_{ed,k,scaled}^2 = \beta_{ed,1}^2 + \beta_{ed,1}^2 + (\sqrt{2} \beta_{ed,1})^2 + \\ \qquad (\sqrt{2} \beta_{ed,1})^2 \\ \qquad = (2 + 2(\sqrt{2})^2)\beta_{ed,1}^2 \\ \qquad = 6\beta_{ed,1}^2 \end{cases}$$

After the scaling the transmit power should be equal to the maximum allowed transmit power i.e. the problem is to find $\beta_{ed,n,scaled}$ and $\beta_{ec,scaled}$ so that $P_{tx,scaled} = P_{max}$. This can be obtained by solving the square sum of enhanced channels, $\sigma_{enh}$, from the equation $$\frac{P_{tx}}{P_{max}} = \frac{P_{tx}}{P_{tx,scaled}} \quad (7)$$

$$\Leftrightarrow \frac{P_{tx}}{P_{max}} = \frac{P \cdot \sigma_{ini}}{P(\sigma_{others} + \sigma_{enh})}$$

$$\Leftrightarrow \sigma_{enh} = \frac{\sigma_{ini} P_{max}}{P_{tx}} - \sigma_{others}$$

As the power of enhanced channels is now a function of square sums and powers one can substitute Equations 4 and 5 into the Equation 7

$$\sigma_{enh} = \frac{\sigma_{ini} P_{max}}{P_{tx}} - \sigma_{others} = \beta_{ec}^2 + K_{ed} \beta_{ed,norm,scaled}^2, \quad (8)$$

to solve the scaled, normalized E-DPDCH gain factor by writing the equation 8 in a form $$\beta_{ed,norm,scaled} = \sqrt{\frac{1}{K_{ed}} \left( \frac{\sigma_{ini} P_{max}}{P_{tx}} - \sigma_{others} - \beta_{ec}^2 \right)}. \quad (9)$$

The ratio at block 306 of FIG. 3 is directly from equation (7) above.

When the E-DPCCH boost mode is not configured the E-DPCCH gain factor, $\beta_{ec}$, in equation 9 is signaled by the network. In that case the UE 10 finds from the comparing at block 308 that the transport format combination indicator E-TFCI$_i$ is less than (or equal to) E-TCFI$_{i,boost}$ (since there is no boost mode configured) and gets the signaled beta factor $\beta_{ec,signaled}$ at block 320. The subscript i indicates transport channel. The UE then determines for equation (7) the power of the other channels to fill its maximum allowed power at bock 322, and determines the normalized and scaled beta as seen at equations (8) and (9) for block 324. Since the boost mode is not configured, then $\beta_{ed,scaled}$ at block 318 is the same as $\beta_{ed,norm,scaled}$ obtained at block 324.

The normalized E-DPDCH gain factors are the final, scaled E-DPDCH gain factors when either one or two E-DPDCH channels are active. However, if all four E-DPDCH channels are active two of them have to be multiplied by $\sqrt{2}$ i.e.

$$\begin{cases} \beta_{ed,scaled,1} = \beta_{ed,scaled,2} = \beta_{ed,norm,scaled} \\ \beta_{ed,scaled,3} = \beta_{ed,scaled,4} = \sqrt{2} \beta_{ed,norm,scaled} \end{cases} \quad (10)$$

Algorithm description for E-DPCCH boost mode. When the E-DPDCH boost mode is configured the un-quantized E-DPCCH gain factor depends on the E-DPDCH gain factor (s) as described in 3GPP TS 25.214. Where the boost mode is configured and the comparison at block 308 finds that the transport format combination indicator E-TFCI$_i$ is greater than E-TCFI$_{ec,boost}$, the unmodified result would be the UE exceeding its maximum allowed transmit power, and so the diagram of FIG. 3 continues in that case to block 310. First is described how the E-DPCCH gain factor is calculated and then the validity of the calculated E-DPCCH is checked against the signaled E-DPCCH, though the process blocks for doing so in FIG. 3 are not separated according to those functions.

By expressing $\beta_{ec}^2$, as the function of E-DPDCH gain factor(s), equation 8 can be written as $$P_{enh} = \frac{\sigma_{ini} P_{max}}{P_{tx}} - \sigma_{others} \quad (11)$$

$$= \beta_c^2 \cdot \left( \frac{K_{ed} \beta_{ed,norm,scaled}^2}{10^{\frac{\Delta T2TP}{10}}} - 1 \right) + K_{ed} \beta_{ed,norm,scaled}^2$$

Finally, the normalized, scaled, E-DPDCH gain factor at block 312 can be solved from the equation 11 by $$\beta_{ed,norm,scaled} = \sqrt{\frac{\frac{\sigma_{ini} P_{max}}{P_{tx}} - \beta_d^2 - \beta_{hs}^2}{\frac{\beta_c K_{ed}}{10^{\frac{\Delta T2TP}{10}}} + K_{ed}}} \quad (12)$$

and the corresponding scaled gain factor of the E-DPCCH can be calculated by $$\beta_{ec,scaled} = \beta_c \cdot \sqrt{\frac{K_{ed} \beta_{ed,norm,scaled}^2}{10^{\frac{\Delta T2TP}{10}}} - 1}. \quad (13)$$

Validity of the scaled E-DPCCH gain factor: When the boost mode is configured the following inequality $$\frac{K_{ed}}{10^{\frac{\Delta T2TP}{10}}} - 1 > \beta_{ec}^2 \quad (14)$$

must be valid to guarantee that the $\beta_{ec,scaled}$ will remain equal to, or higher than the corresponding value signaled by the network. If the inequality in equation 14 is not valid then the scaling process is about to scale $\beta_{ec,scaled}$ below the signaled value, which is not allowed by the standard 3GPP TS 25.214. In this case the scaling process must be continued by using the signaled E-DPCCH gain factor as described above as the algorithm for the normal mode, i.e. to re-calculate the normalized, scaled E-DPDCH gain factor by using the signaled E-DPCCH gain factor according to the equation 9 and further determine the final E-DPDCH gain factors according to the equation 10. The determination at block 310 of 10 exp ($\Delta$T2TP/10), for use in the denominator of equation 14 is to convert the signaled power to the total power offset parameter from the decibel to the corresponding linear value, and to check validity of $\beta_{ec}$ at block 316 by equation 14 itself. Another issue to take into account is that the scaled E-DPDCH gain factor(s) should not be smaller than the minimum allowed value with the exception that the original values are maintained if the gain factors before scaling are already below the minimum value.

So long as this validity check passes, then at block 318 equation 13 can be used to compute $\beta_{ed,scaled}$ from $\beta_{ed,norm,scaled}$ at equation (12) and block 312.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate. Embodiments of the invention may therefore be evident in the underlying designs from which such a chip is manufactured as well as in the manufactured chip itself.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

The invention claimed is:

1. A method comprising:
   determining, by a computing device, a data channel gain factor and a control channel gain factor;
   applying the control channel gain factor, resulting in an applied control channel gain factor;
   determining that total transmit power would exceed a maximum allowed value after applying the control channel gain factor;
   reducing, by the computing device, the data channel gain factor so that the total transmit power does not exceed the maximum allowed value, resulting in a reduced data channel gain factor; and
   using the applied control channel gain factor and the reduced data channel gain factor when a boost mode is configured for a control channel.

2. The method according to claim 1, wherein a data channel comprises a plurality k of data channels E-DPDCH$_k$ and the data channel gain factor comprises a plurality of k data channel gain factors $\beta_{ed,k}$; and wherein reducing the data channel gain factor comprises equally scaling each of the k data channel gain factors $\beta_{ed,k}$.

3. The method according to claim 1, wherein the control channel gain factor is determined from the data channel gain factor.

4. The method according to claim 1, further comprising using the control channel gain factor when the boost mode is not configured for the control channel, wherein the control channel gain factor is received in signaling from an access node.

5. The method according to claim 1, wherein a user equipment includes the computing device, a data channel comprises an E-DPDCH, and the control channel comprises an E-DPCCH.

6. The method according to claim 5, in which the boost mode is configured if E-TFCI$_i$>E-TFCI$_{ec,boost}$, in which E-TFCI$_{ec,boost}$ is wirelessly received from an access node and E-TFCI$_i$ is a transport format combination indicator for an i$^{th}$ transport channel.

7. The method according to claim 1, wherein:
   determining that the total transmit power would exceed the maximum allowed value is performed by the computing device; and the method further comprises:
   transmitting on a data channel by at least one transmitter at a transmit power which depends on the reduced data channel gain factor; and
   transmitting on the control channel by the at least one transmitter at a transmit power which depends on the applied control channel gain factor.

8. An apparatus comprising:
   at least one processor; and
   a memory storing computer readable instructions configured to, with the at least one processor, cause the apparatus at least to:
   determine a data channel gain factor and a control channel gain factor;
   apply the control channel gain factor, resulting in an applied control channel gain factor;
   determine that total transmit power would exceed a maximum allowed value after applying the control channel gain factor;
   reduce the data channel gain factor so that the total transmit power does not exceed the maximum allowed value, resulting in a reduced data channel gain factor; and
   use the applied control channel gain factor and the reduced data channel gain factor when a boost mode is configured for a control channel.

9. The apparatus according to claim 8, wherein a data channel comprises a plurality of data channels E-DPDCH$_k$ and the data channel gain factor comprises a plurality of k data channel gain factors $\beta_{ed,k}$; and wherein memory further stores executable instructions configured to, with the at least one processor, cause the apparatus to reduce the data channel gain factor by equally scaling each of the k data channel gain factors $\beta_{ed,k}$.

10. The apparatus according to claim 8 wherein the executable instructions are configured to, with the at least one processor, cause the apparatus to determine the control channel gain factor from the data channel gain factor.

11. The apparatus according to claim 8, further comprising a receiver configured to receive the control channel gain factor from an access node; and at least one transmitter configured to transmit on the control channel using the control channel gain factor when the boost mode is not configured for the control channel.

12. The apparatus according to claim 8, wherein the apparatus comprises a user equipment; a data channel comprises an E-DPDCH; and the control channel comprises an E-DPCCH.

13. The apparatus according to claim 12 further comprising a receiver; and
   wherein the boost mode is configured if E-TFCI$_i$>E-TFCI$_{ec,boost}$; the receiver is configured to wirelessly receive E-TFCI$_{ec,boost}$ from an access node; and E-TFCI$_i$ is a transport format combination indicator for an i$^{th}$ transport channel.

14. A memory storing executable instructions that, when executed, cause an apparatus at least to:
   determine a data channel gain factor and a control channel gain factor;
   apply the control channel gain factor, resulting in an applied control channel gain factor;
   determine that total transmit power would exceed a maximum allowed value after applying the control channel gain factor;
   reduce the data channel gain factor so that the total transmit power does not exceed the maximum allowed value, resulting in a reduced data channel gain factor; and use the applied control channel gain factor and the reduced data channel gain factor when a boost mode is configured for a control channel.

15. The memory according to claim 14, wherein a data channel comprises a plurality k of data channels E-DPDCH$_k$ and the data channel gain factor comprises a plurality of k data channel gain factors $\beta_{ed,k}$; and wherein reducing the data channel gain factor comprises equally scaling each of the k data channel gain factors $\beta_{ed,k}$.

16. The memory according to claim 14 wherein the control channel gain factor is determined from the data channel gain factor.

17. The memory according to claim 14, wherein the executable instructions, when executed, cause the apparatus to use the control channel gain factor when the boost mode is not configured for the control channel, wherein the control channel gain factor is received in signaling from an access node.

18. The memory according to claim 14, wherein the memory is resident within a user equipment, and wherein a data channel comprises an E-DPDCH and the control channel comprises an E-DPCCH.

19. The memory according to claim 18 wherein the boost mode is configured if E-TFCI$_i$>E-TFCI$_{ec,boost}$ wherein E-TFCI$_{ec,boost}$ is wirelessly received from an access node; and wherein E-TFCI$_i$ is a transport format combination indicator for an i$^{th}$ transport channel.

20. The memory according to claim 14 wherein the executable instructions, when executed, cause the apparatus to:

transmit on a data channel by at least one transmitter at a transmit power which depends on the reduced data channel gain factor; and transmit on the control channel by the at least one transmitter at a transmit power which depends on the applied control channel gain factor.

* * * * *